Oct. 6, 1953   E. MAY   2,654,543
REGULATOR FOR TAKE-UP REELS
Filed Oct. 21, 1949   3 Sheets-Sheet 1

INVENTOR.
ERWIN MAY
BY
Fred A. Kleen
ATTORNEY

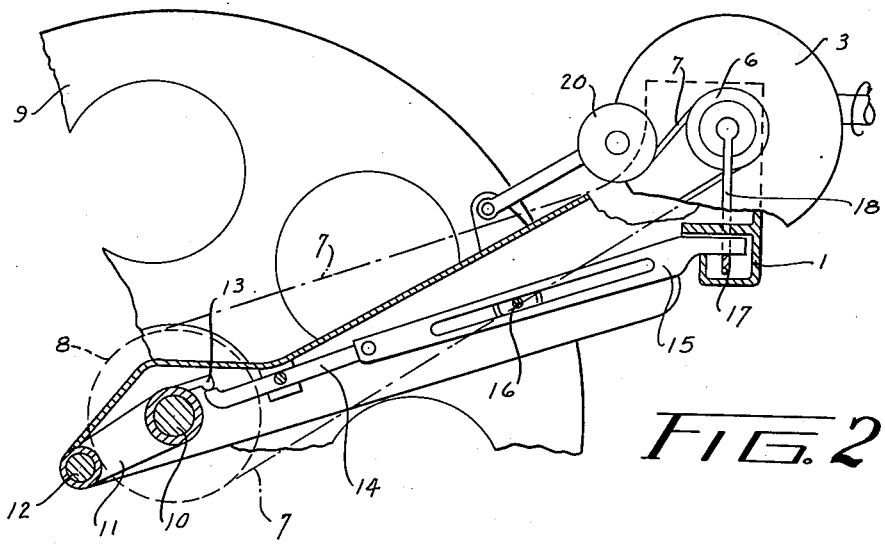
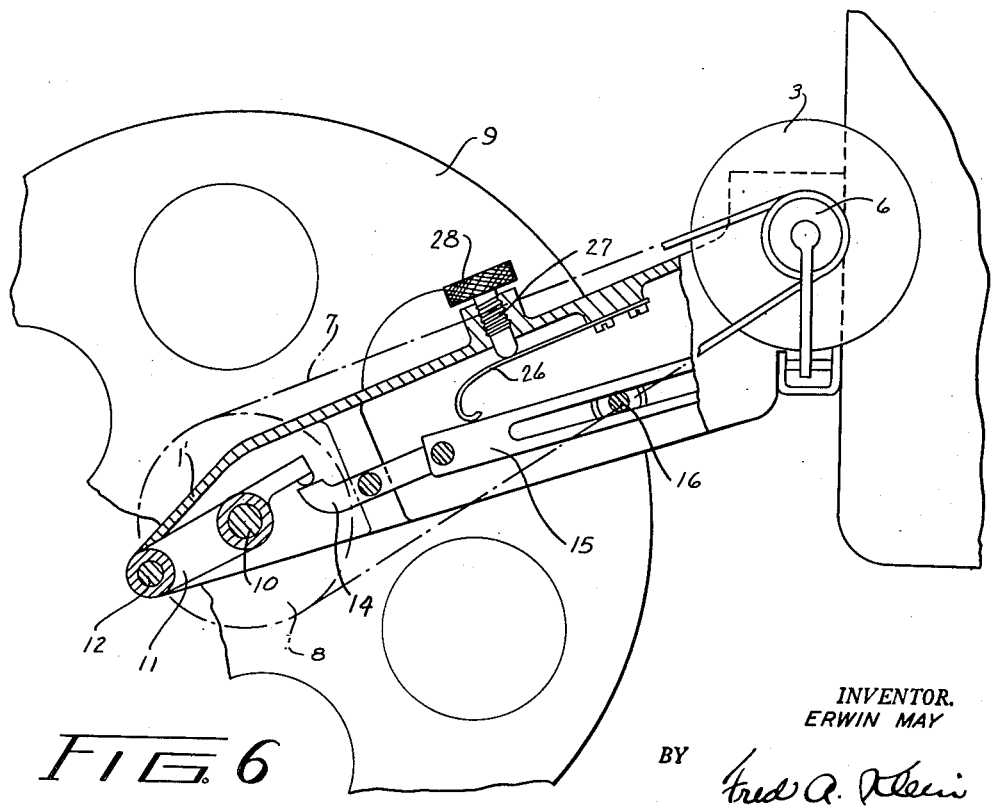

Oct. 6, 1953 E. MAY 2,654,543
REGULATOR FOR TAKE-UP REELS
Filed Oct. 21, 1949 3 Sheets-Sheet 3

INVENTOR.
ERWIN MAY
BY
Fred A. Klein
ATTORNEY

Patented Oct. 6, 1953

2,654,543

UNITED STATES PATENT OFFICE 2,654,543

REGULATOR FOR TAKE-UP REELS

Erwin May, Wetzlar, Germany, assignor to Ernst Leitz, G. m. b. H., Wetzlar, Germany, a corporation of Germany Application October 21, 1949, Serial No. 122,714
In Germany October 4, 1948

7 Claims. (Cl. 242—55)

1

The present invention relates to a device for the automatic regulation of the motive power of reels, particularly take-up reels of motion picture projectors.

To afford satisfactory operation, the speed of take-up reels must be adjusted in accordance with the changing diameter of the film being reeled. For this purpose, there have been provided friction couplings which transmit the rotation of the drive mechanism, which is constant, to the take-up reel. In known devices of this nature, the increasing weight of the take-up reel, as more film accumulates thereon, acts directly as the coupling force. However, such devices do not operate satisfactorily under most practical conditions.

It is an object of the present invention to provide an arrangement for the automatic regulation of the speed of take-up reels which assures satisfactory operation under all operating conditions.

It is a more specific object of this invention to provide an indirect transmission system in an automatic regulation device for take-up reels, whereby the pull upon the film to be reeled may be kept constant throughout the entire take-up.

The above and other objects and advantages of the invention are accomplished by providing an automatic adjusting device for controlling the speed of motion picture projector take-up reels with a lever system with adjustable transmission which indirectly transmits the force of the changing weight of the take-up reel to the friction coupling.

In accordance with another feature of the invention, the reel axis is so arranged with respect to the driving means for the reel that the driving force exerted upon the reel does not affect the friction coupling.

It is also a feature of the invention to construct the friction coupling in such manner and of such material as to assure dependable transmission conditions for the driving force of the reel and to avoid the usual servicing and lubrication of the coupling.

It is still another feature of the invention to provide spring means arranged in cooperative relation with the lever system, said spring means being adapted to counter-balance at least partly the reel and film weight.

Further features and advantages of the present invention will become more apparent from the following detailed description in conjunction with the accompanying drawings showing several preferred embodiments of this invention for the purposes of illustration only and not in any way limiting the scope and spirit of the invention, as defined in the appended claims.

In the drawing,

Fig. 1 shows a schematic diagram of a driving mechanism according to the invention;

2

Fig. 2 shows one preferred embodiment of the invention;

Fig. 6 shows a device according to the invention incorporating a counter-balance mechanism;

Figure 1:
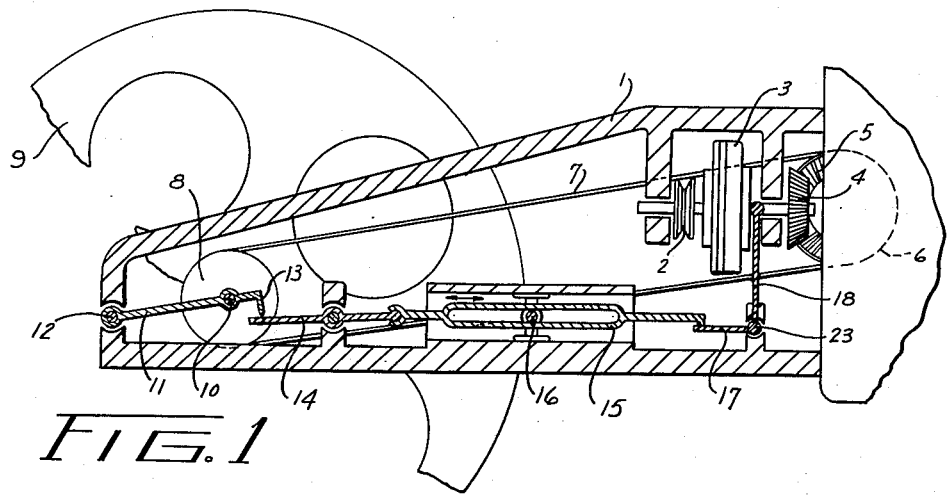
Figure 3:
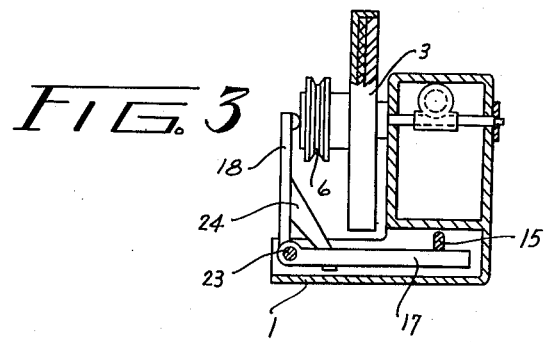
Fig. 3 shows, in detail, the transmission from the lever system to the friction coupling of the embodiment of Fig. 2.

Referring now to Fig. 1, reel supporting arm 1 is fastened in any convenient manner, removably if desired, to the projector whose driving mechanism, also in conventional manner, is adapted to turn the wheel 2 attached to arm 1, the rotation of wheel 2 being transmitted to the take-up reel 9 by means of friction coupling 3, conical gear drive 4, 5; pulley 6; driving belt 7, and pulley 8. The axle 10 of pulley 8 and take up reel 9 is supported by one-armed lever 11. This lever 11 is pivotally connected to reel arm 1 at 12, while the free end 13 thereof engages two-armed lever 14. Lever 14 reverses the direction of motion and fixedly engages two-armed lever 15 whose fulcrum 16 is transversely adjustable along the reel arm 1. Lever 15, in turn, acts upon the arm 17 of an angle lever whose vertical arm 18 presses upon friction coupling 3.

Figure 5:
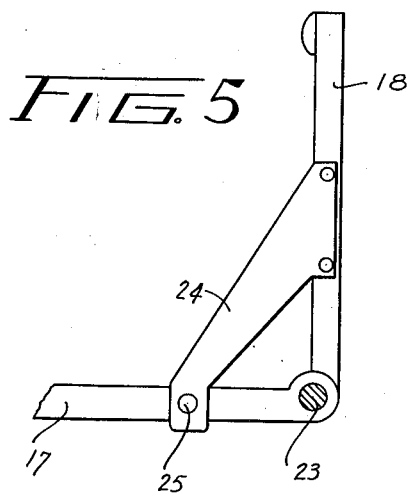
Fig. 5 shows an enlarged view of the angle lever engaging the friction coupling of Fig. 3.

As shown in Fig. 5, the angle lever comprises the two lever arms 17 and 18 which are hinged together at 23 and diagonally supported by flexible blade 24. Blade 24 is fastened to the lever arm 18 and extends diagonally to lever arm 17 where a pin is adapted to engage hole 25 of blade 24, whereby the two lever arms are kept in their position. By disconnecting the blade 24, the lever arm 18 may be swung back so that the friction coupling 3 and pulley 6 become freely accessible and the endless belt 7 may be changed.

Figure 4:
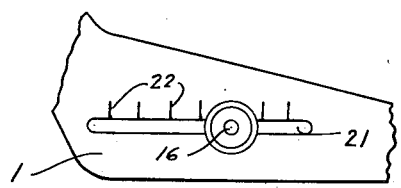
Fig. 4 shows the adjusting indications for the two-armed lever.

As shown in Fig. 2, belt 7 may be kept under pressure by tension roller 20 which is held down by a spring. This arrangement insures a more efficient transmission of power. Arm 1 is provided with a transverse slot 21 (see Fig. 4) in which the fulcrum 16 of lever 15 may be moved into the various positions indicated by markers 22 of a scale provided on the reel arm 1. This scale is graduated in terms of reel weight, film length and like parameters. The friction coupling 3 may be provided with graphite disks as friction lining whereby special servicing and lubrication of the coupling is obviated.

Figure 7:
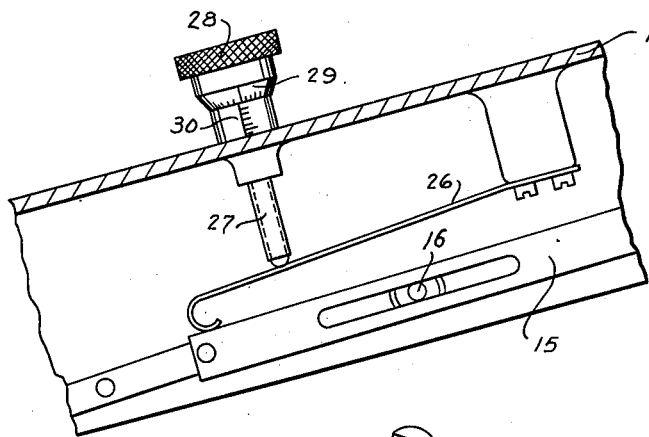
Fig. 7 shows, in detail, the counter-balancing mechanism of Fig. 6.

Referring now to Fig. 6, this shows the counter-balancing of the reel and film weight by means of a leaf spring whose free end exerts a variable pressure upon the two-armed lever with the movable fulcrum. Leaf spring 26 is provided to permit adjustable balancing of the weight of reel 9. The leaf spring is fastened to reel arm 1 and is adapted to act upon lever 15. The adjusting screw 27 is threaded into reel arm 1 for the adjustment of the tension of spring 26, thereby permitting a variation of the tension of spring 26, from zero to any desired value. Knurled head 28 of the screw 27 may be provided with a scale indicating reel weight, film length or similar indications. The pitch of the thread of the adjusting screw may be so chosen that a single rotation of the screw will correspond to a total release of pressure. By employing a thread requiring several rotations of adjusting screw 27 to cover the total range of desired pressure, a vernier similar to that of a micrometer 29, 30 may be provided (see Fig. 7).

As shown in Figs. 2 and 6, the axis 12 of one-armed lever 11, axis 10 of the reel, which is also the axis of one of the pulleys of the transmission system, and the axis of pulley 6 are arranged in the same plane. In the actual operation of the inventive device, the movement of axis 10 is negligible and the three axes remain, therefore, substantially in the same plane and practically no diverting force from the endless belt is exerted upon the lever system.

Figure 8:
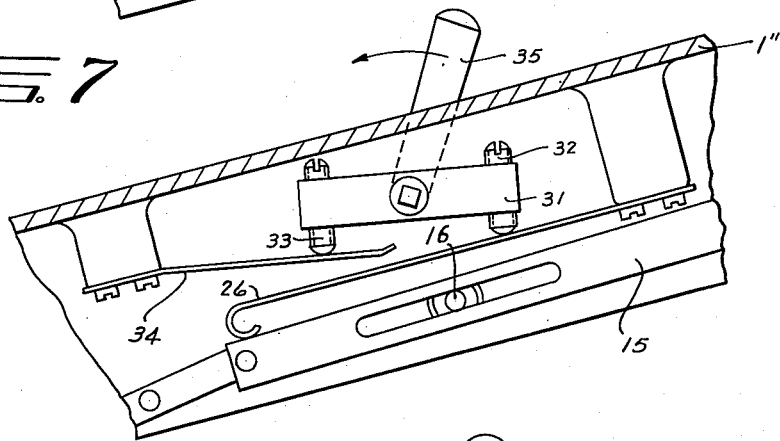
Figs. 8 and 9 show two further embodiments of the counter-balancing mechanism.

Fig. 8 shows another embodiment of the counter-balancing mechanism wherein a rocking lever 31 is tiltably attached to the reel arm. The lever carried at its ends adjusting screws 32, 33 which are adapted to engage leaf springs 26 and 34, respectively. The rocking lever may be thrown into two end positions by means of handle 35. Adjusting screw 32 of lever 31, in one end position of the lever, engages leaf spring 26. Adjusting screw 33 acts upon leaf spring 34, which, in turn, is brought to bear upon leaf spring 26 by moving the lever into its other end position. The tension corresponding to the second end position of the lever may be varied by turning adjusting screw 33.

Figure 9:
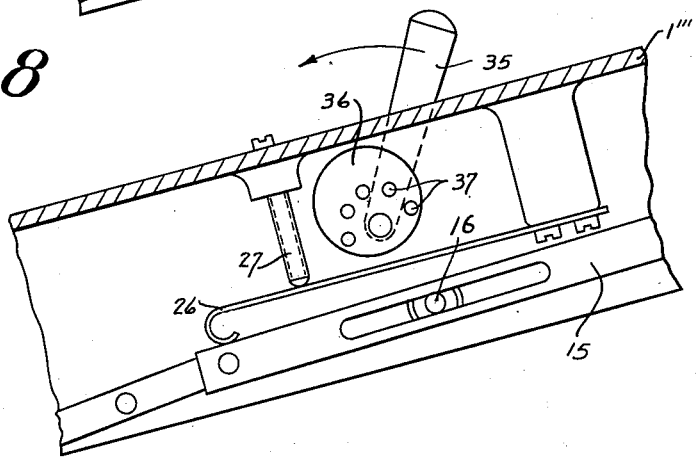

In the embodiment of the counter-balancing mechanism shown in Fig. 9, an adjusting screw 27 threaded into reel arm 1 engages leaf spring 26 which is fastened to reel arm 1. The handle 35 carries an eccentric wheel 36, provided with several stops 37 by which the handle 35 and the wheel 36 may be adjustably fixed in relation to each other. The handle is movable into two end positions, as in the embodiment of Fig. 8, the stops 37 being so arranged that each stop corresponds to a desired tension of the leaf spring. The tension may thus be regulated by adjusting the position of the eccentric wheel in the handle 35. By turning the handle into its other end position, the desired tension is obtained through the action of ecentric wheel 36 on the leaf spring 26. Adjusting screw 27 serves to regulate the limit of tension release.

Spring 26 has been described as operative upon lever 15 of the lever system 10—18. However, it may also be in engagement with any other lever of the lever system. It is further understood that numerous variations of the above embodiments of the present invention may be affected without departing from the spirit and scope thereof.

What is claimed is:

1. A film winding device comprising a reel; driving means for said reel including an endless belt mounted on two pulleys; a friction coupling transmitting the motion of said driving means to said reel; and a lever system including a single-armed lever carrying the reel, and a lever having a transversely movable fulcrum, said latter lever being adapted to transmit the force of the reel weight to said friction coupling, the pivot of said single-armed lever, the axis of said reel and the axes of said pulleys being arranged substantially in the same plane.

2. Device according to claim 1, wherein said lever system comprises an angle lever acting upon said friction coupling, the arms of said angle lever being hinged together and held in position by a leaf spring detachably connected to at least one of said arms.

3. In combination, a motion picture projector take-up reel, and a transmission system for the automatic regulation of the motive power of said reel, said system comprising driving means, a friction coupling, adjustable lever means adapted to change the rate of transmission, a leaf spring adapted to counter-balance the weight of the reel and to act upon said lever means, and means for changing the tension characteristic of said leaf spring, the latter means including an adjustable member arranged to engage said leaf spring at least at one point.

4. A film winding device comprising a take-up reel; pivotable support means for said reel; means for regulating the motive power of the reel; and driving means for said reel including two pulleys and an endless belt, the axes of said pulleys, of said reel and said pivot of said support means being arranged substantially in the same plane.

5. In combination, a motion picture projector take-up reel, and a transmission system for the automatic regulation of the motive power of said reel, said system comprising driving means, a friction coupling, adjustable lever means adapted to change the rate of transmission, and two leaf springs adapted to counter-balance the weight of the reel and to act upon said lever means, the tension characteristic of said two leaf springs being adjustable by a rocking lever adapted to be thrown into two end positions in engagement with one or the other of said leaf springs.

6. The combination of claim 5, wherein said rocking lever is provided with adjustment screws in engagement with said leaf springs.

7. In combination, a motion picture projector take-up reel, and a transmission system for the automatic regulation of the motive power of said reel, said system comprising driving means, a friction coupling, adjustable lever means adapted to change the rate of transmission, spring means adapted to counter-balance the weight of the reel and to act upon said lever means, and an eccentric wheel-lever arrangement in engagement with said spring means and said wheel and lever being adjustable in relation to each other.

ERWIN MAY.

References Cited in the file of this patent

UNITED STATES PATENTS

| Number | Name | Date |
|---|---|---|
| 1,277,559 | Emory | Sept. 3, 1918 |
| 1,654,800 | Garbutt | Jan. 3, 1928 |
| 1,857,780 | Frappier et al. | May 10, 1932 |
| 1,916,467 | Eger | July 4, 1933 |
| 2,429,561 | Miller | Oct. 21, 1947 |
| 2,461,033 | Canady | Feb. 8, 1949 |

FOREIGN PATENTS

| Number | Country | Date |
|---|---|---|
| 18,360 | Great Britain | of 1908 |